United States Patent Office 3,477,258
Patented Nov. 11, 1969

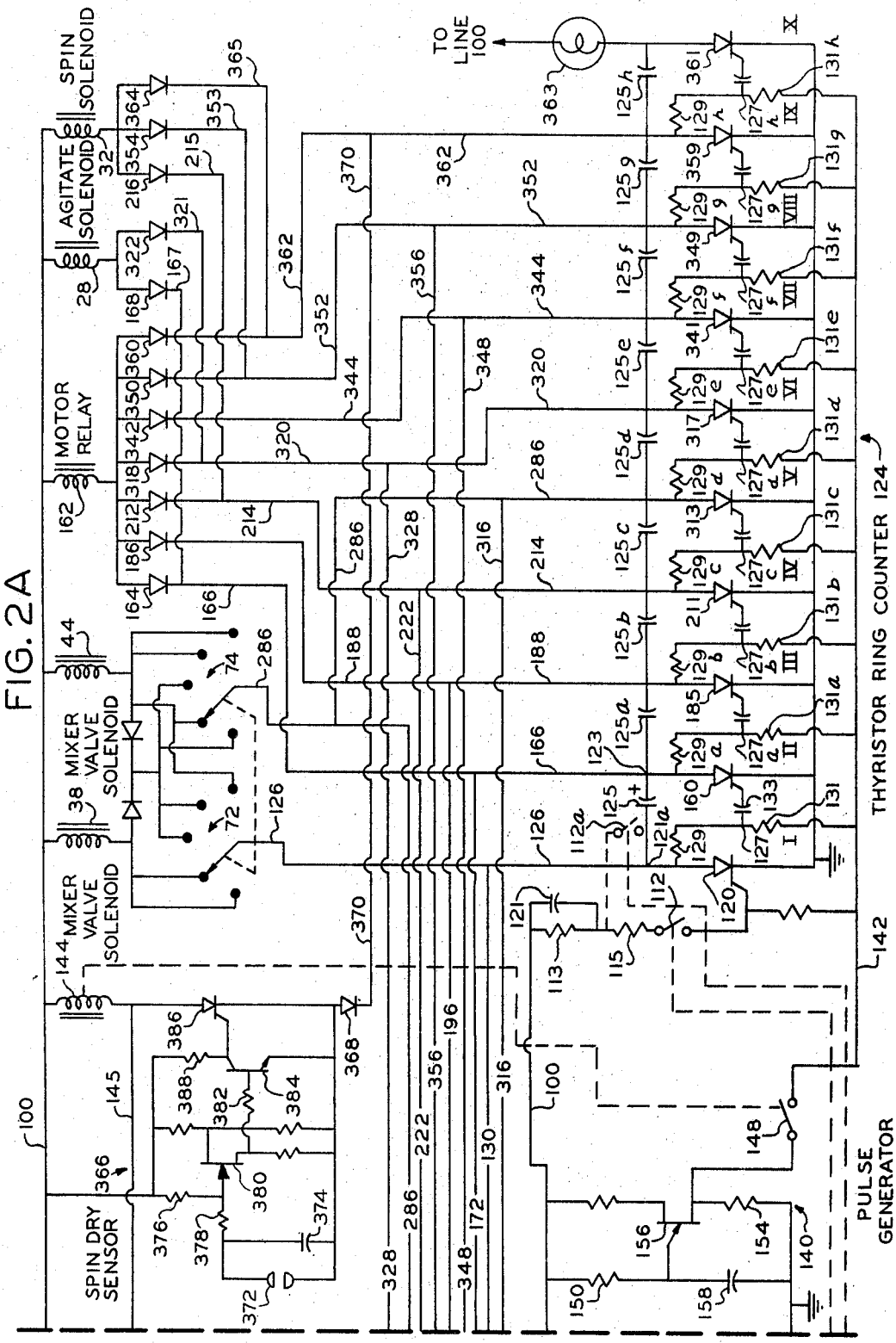

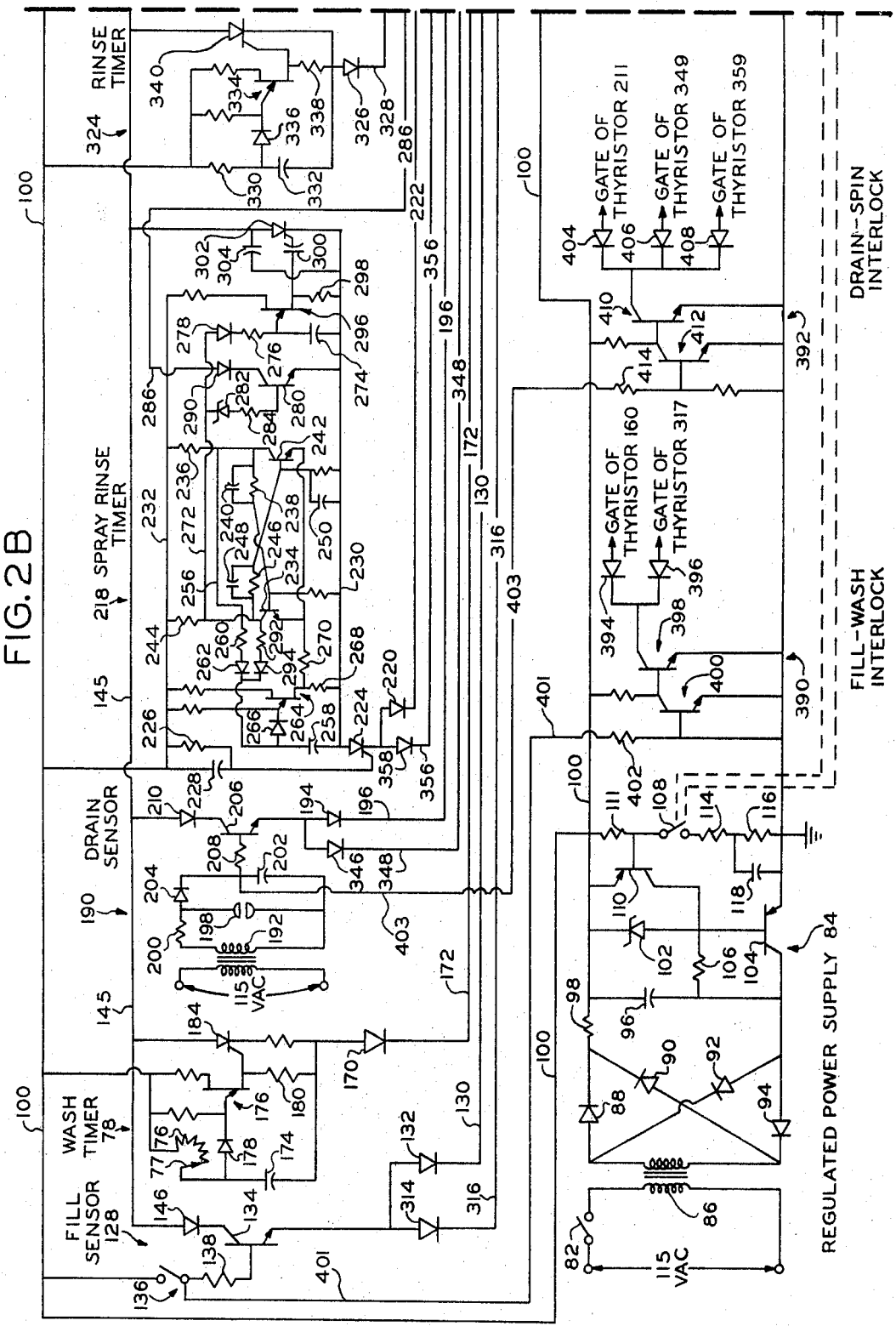

3,477,258
TOTAL SENSING AUTOMATIC WASHER
Douglas J. Walker and Oscar A. W. Tichy, St. Joseph, Mich., assignors to Whirlpool Corporation
Filed May 20, 1968, Ser. No. 736,918
Int. Cl. D06f *33/00;* H01h *33/59, 7/00*
U.S. Cl. 68—12                                         14 Claims

ABSTRACT OF THE DISCLOSURE

An electronic sequential control utilizing a thyristor ring counter, each successive stage of which controls such functions as water fill, agitate, drain and extract that make up the cycle of operation for a laundry appliance. Advancement through all successive steps of the cycle of operation is controlled either by RC timer circuitry having a number of selective delays or by circuitry responsive to sensed conditions. The counter selects the appropriate delay in the timer or the proper condition responsive circuit which causes the counter to advance to the next successive stage.

DISCUSSION OF PRIOR ART

In prior art laundry appliances, control systems typically included an electromechanical timer to sequentially control the various steps comprising a cycle of operation. As the number of special cycles needed to handle various types of fabrics increased, it becames increasingly difficult to include them all in one 360° rotation of the timer cams. Thus, using a constant speed timer, flexibility of operational control became quite limited. This forced manufacturers of laundry appliances to use different timers for machines having different cycling features.

In addition, present day timers limit the styling of a laundry appliance because control location is dictated by the location and character of the timing mechanism.

Prior art control mechanisms rely strictly on time as a basis for cycle control. Although time is a reliable basis for cycle control. Although time is a reliable basis for controlling such laundering steps as WASH and RINSE, it is more desirable to terminate certain certain steps such as FILL, DRAIN and EXTRACT on the basis of sensed conditions. Such condition responsive control is not possible in the present day control systems.

Due to the intricacy of electromechanical timers containing many cam actuated switches and complicated gear trains, reliability is likely to be a problem. The emphasis which manufacturers of contemporary laundry appliances have placed on reliability, coupled with the public's demand for more special cycles, has made it necessary as well as more difficult to manufacture highly reliable electromechanical timers.

SUMMARY

These and other disadvantages of prior art control systems are overcome by this invention through the provision of an all electronic solid state appliance control which is highly reliable and flexible in operation. It basically comprises three RC timer circuits, three condition responsive circuits and a ten stage thyristor ring counter. As each sequential stage of the ring counter is rendered conductive, various machine function actuators are energized and the machine is advanced through the steps comprising a cycle of operation. During WASH, RINSE and SPIN-SPRAY steps, a selected RC timer circuit is energized by the counter which advances the counter after a preset period of time. During of FILL, DRAIN and SPIN-DRY steps is controlled by a selected, condition responsive circuit energized by the stage of the counter controlling that step. Other features of the invention include option switches for initiating machine operation at any step in its cycle, interlock circuits for insuring that machine operation cannot be initiated at a step which would result in damage to the machine or the clothes being laundered. a control for presetting the time duration of the WASH step, and a control for presetting the wash and rinse water temperature.

Being entirely electronic in natural, there are no moving control parts involved and, therefore, no mechanical wear and fatigue and no contact corrosion problems. Moreover, since all active elements in the control circuit are solid state devices, the invention lends itself readily to integrated and/or printed circuit fabrication with attendant compactness, reliability and lower power dissipation.

BRIEF DESCRIPTION OF THE DRAWINGS

Further objects and advantages of the present invention will be apparent from the following description, reference being had to the accompanying drawings wherein a preferred embodiment of the present invention is clearly shown:

FIGURE 2A is the first part of a schematic circuit diagram of the control; and

FIGURE 2B is the second part of the schematic circuit diagram of the control.

DESCRIPTION OF THE PREFERRED EMBODIMENT

Figure 1:
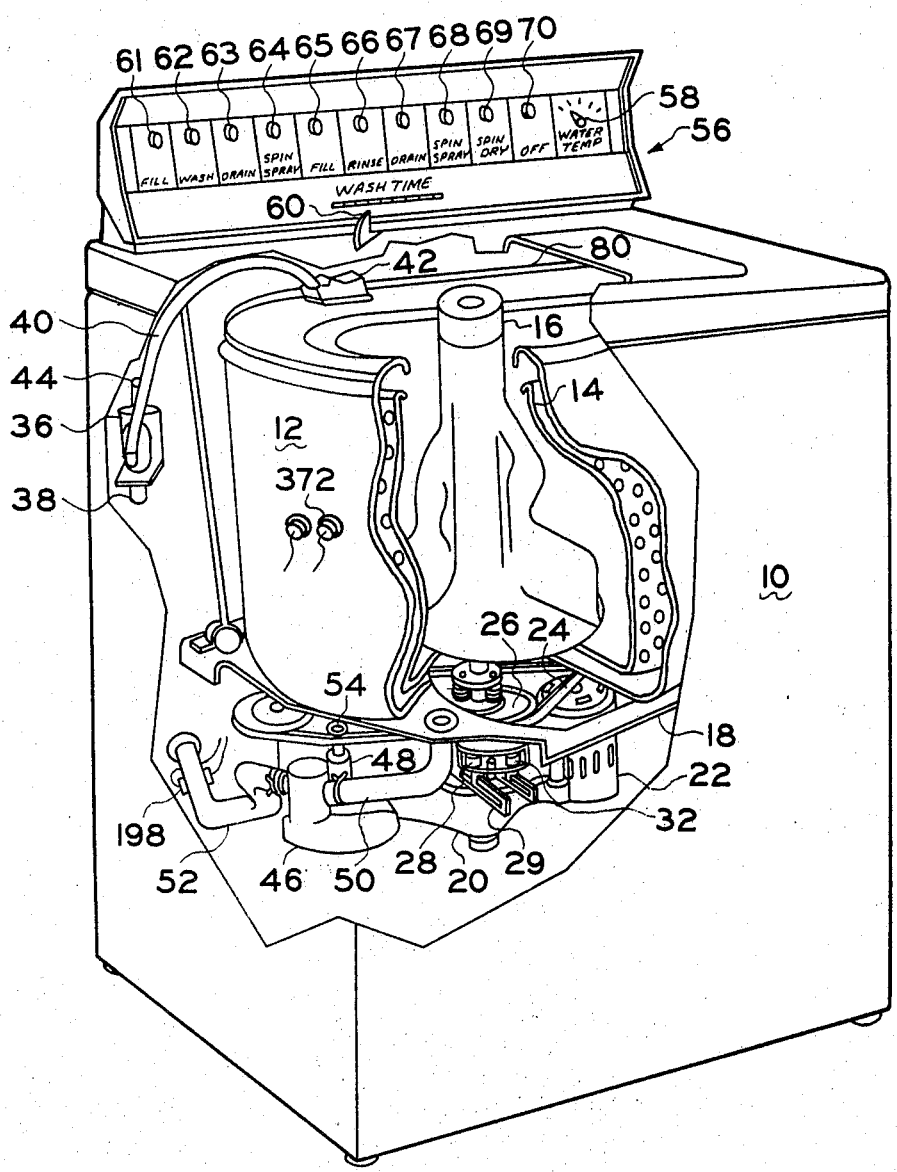
FIGURE 1 is a fragmentary perspective view of a washing machine provided with a control embodying the invention.

In the illustrated embodiment of the invention disclosed in the drawings, an automatic washer of generally conventional construction is shown to include a cabinet 10, a casing 12 and a clothes containing basket 14. Mounted within basket 14 is an upstanding agitator 16 for imparting mechanical agitation to clothing being laundered. Positioned below a machine base plate 18 is a transmission 20 which is mechanically driven by a drive motor 22 through a belt 24 and a pulley 26. With an agitate solenoid 28 energized, agitator 16 is driven in an oscillatory manner. With a spin solenoid 32 energized, basket 14 is driven unidirectionally at a speed of approximately 540 r.p.m.

In order to supply laundry liquid to casing 12 at the proper time, a mixer valve 36 is provided. A pair of mixer valve solenoids, 38 and 44, control admission of hot and cold laundry liquids respectively to casing 12 via an inlet conduit 40 and a vacuum break 42. Admission of warm laundry liquid is effected by simultaneously energizing both solenoids 38 and 44.

A pump 46 is provided to recirculate and remove laundry liquid from casing 12. Pump 46 is driven unidirectionally throughout the cycle of operation by motor 22 via belt 24 and a pump pulley 54. Recirculation of laundry liquid through a filter (not shown) during the WASH and RINSE steps is effected by energized agitate solenoid 28 which causes a cam bar 29 to move longitudinally and actuate a flow reversing valve 48 to a first position through a mechanical linkage (not shown). Laundry liquid is now drawn from the side of casing 12 through a conduit (not shown) and a filter (not shown) by pump 46 after which it passes through a conduit 50 leading into the bottom of casing 12. Draining of laundry liquid during DRAIN, SPIN and SPIN-SPRAY steps is effected by de-energization of solenoid 28. De-energization of solenoid 28 causes cam bar 29 to again move longitudinally and valve 48 is moved to a second position by the mechanical linkage (not shown). Laundry liquid is now routed through pump 46 in the opposite direction. This reverse flow causes operation of appropriate check valves (not shown) and laundry liquid is pumped from casing 12 through conduits 50 and 52 to a suitable drain.

The washing machine is further provided with a control console 56. Mounted on console 56 is a water temperature selection switch 58, a selector lever 60 for presetting the length of the machine's WASH step and a group of push-buttons 61 through 70 for initiating machine operation at any one of a series of ten discrete steps defining a cycle of machine operation.

Turning now to FIGURES 2A and 2B, the control circuit generally consists of the following subcircuits connected in cooperative relationship with each other:

(1) Subcircuits directly controlling physical machine operations:

(a) Motor relay 162
(b) Agitate solenoid 28
(c) Spin solenoid 32
(d) Mixer valve solenoid 38
(e) Mixer valve soleniod 44

(2) Subcircuits controlling advancement through a cycle of operation:

(a) Fill sensor 128
(b) Wash timer 78
(c) Drain sensor 190
(d) Spray rinse timer 218
(e) Rinse timer 324
(f) Spin dry sensor 366

(3) Subcircuit for sequentially energizing selected sub-circuits included under (1) and (2) above: (a) Thyristor ring counter 124.

(4) Miscellaneous subcircuits:

(a) Regulated power supply 84
(b) Fill-wash interlock 390
(c) Drain-spin interlock 392
(d) Pulse generator 140

In general, subcircuits listed under (1) and (2) above are continuously supplied with 24 v. DC power from regulated supply 84. Further, each of the subcircuits of (1) and (2) is tied to ground through one or more selected thyristors in counter 124. As successive thyristors in counter 124 are rendered conductive, selected subcircuits are connected to ground, at which time they will be energized to control the machine's operation. For example, during conduction of a thyristor 120 in Stage I of counter 124, solenoid 38 and fill sensor 128 are connected to ground. Solenoid 38 admits hot laundry liquid to casing 12 and fill sensor 128 advances the counter from Stage I to Stage II when the FILL step is complete. This sequential control of laundering steps continues as the machine is guided through the following ten steps:

I—FILL
II—WASH
III—PUMP-OUT
IV—SPIN-SPRAY
V—FILL
VI—RINSE
VII—PUMP-OUT
VIII—SPIN-SPRAY
IX—SPIN-DRY
X—OFF

Operation of the control circuit of FIGURES 2A and 2B will now be covered in detail. Assume the operator has selected hot water wash and cold water rinse. This sets a pair of gang connected rotary selector switches, 72 and 74, in the position shown in FIGURE 2A. Further, assume lever 60 has been positioned to give a 12-minute wash period. This moves the wiper arm 77 of a potentiometer 76 to the position shown in FIGURE 2B. Clothing to be laundered is now placed in basket 14 and a machine door 80 (see FIGURE 1) is closed. This closes a door switch 82 (see FIGURE 2B) and the primary of a transformer 86 is energized with 115 volt AC power.

AC voltage of approximately 26 volts now appears across the secondary of transformer 86 and is rectified by a full wave bridge consisting of diodes 88, 90, 92 and 94 Next, this full wave rectified voltage charges a filter capacitor 96 through a resistor 98. A 24-volt Zener diode 102, a resistor 106 and a transistor 104 regulate the DC voltage on a line 100 at precisely 24 volts as follows:

The DC potential on line 100 is equal to the difference of the Zener diode voltage and the emitter-base voltage of transistor 104. When DC potential on line 100 exceeds 24 volts the emitter-base voltage decreases thereby causing transistor 104 to conduct less current and to sustain a higher emitter-collector voltage thereby reducing the voltage on line 100 to 24 volts. Likewise when the voltage on line 100 drops below 24 volts, the emitter-base voltage of transistor 104 increases thereby causing transistor 104 to conduct more heavily and to sustain a lower emitter-collector voltage and thereby increasing the voltage on line 100 to 24 volts. Potential supplied to the load by line 100 thus remains at 24 volts DC since the voltage rise or fall across capacitor 96 is taken up across transistor 104. This action regulates the voltage supplied by the regulated power supply 84 to the controlled subcircuits.

The machine's cycle of operation is initiated by depressing push button 61 on console 56 (refer to FIGURE 1). This closes a pair of switches 108 (FIGURE 2B) and 112 (FIGURE 2A) momentarily. Closed switch 108 biases a transistor 110 into conduction through the bias resistors 111, 114, 116 and a capacitor 118. This shunts out the power supply 84 so that the output voltage of supply 84 drops to zero causing potential on line 100 to drop to zero, which assures that all subcircuits within the control system are reset to an "off" state. Switch 112 conducts firing current to the gate electrode of thyristor 120 (see FIGURE 2A) from line 100 through a pair of bias resistors 113, 115, and a capacitor 121. Thyristor 120 in Stage I of counter 124 now goes into conduction. This energizes solenoid 38 from line 100 through switch 72, a line 126 and conducting thyristor 120 to ground. Hot laundry liquid now begins flowing into casing 12 effecting the FILL step.

As long as thyristor 120 remains conductive, solenoid 38 is energized. In order to proceed with the cycle of operation, pulse generator 140 cooperates with counter 124 in the following manner: With thyristor 120 in conduction, voltage at the point 121a is equal to the voltage drop across conducting thyristor 120, which is about .1 volt. Since a thyristor 160 in Stage II of the counter is nonconductive (as are the remaining eight thyristors), voltage at the point 123 is equal to the drop across non-conducting thyristor 160 or 24 volts. The voltage difference between points 121a and 123 charges a capacitor 125 to 23.9 volts as indicated on FIGURE 2A. However, since all remaining thyristors are nonconductive, capacitors 125a through 125h have no net charge. The low voltage at point 121a further insures a low voltage at the point 127, since it lies between a pair of resistors 129 and 131 forming a resistive divider between point 121a and line 142. However, the corresponding points 127a through 127h in succeeding stages remain at a higher potential of approximately 15 volts as determined by the resistors 129a through 129h and 131a through 131h in conjunction with the high anode voltages of their associated nonconducting thyristors. If a pulse of magnitude greater than .1 volt but less than 15 volts appears on a pulse trigger line 142, it is conducted to the gate of thyristor 160 through resistor 131 and a capacitor 133. However, it is not conducted to the other thyristor gates because it cannot overcome the voltage gradients across resistors 131a through 131h. This pulse turns on thyristor 160. As thyristor 160 goes into conduction, it discharges capacitor 125 and connects it in parallel across thyristor 120 so that thyristor 120 has a negative voltage across it. Thyristor 120 is thereby driven out of conduction by reduction of the current flow through it below its "hold current" level. By this means, pulses on line 142 cause counter 124 to "advance" to the next stage.

Triggering pulses for advancing counter 124 are generated by a unijunction transistor relaxation oscillator comprising pulse generator 140 whose operation is as follows: A capacitor 158 charges through a resistor 150 from line 100. When the charge across capacitor 158 reaches the breakdown potential of a unijunction transistor 156, it fires. This allows the charge stored on capacitor 158 to discharge through transistor 156 and a resistor 154. Thus, a voltage pulse appears at the positive terminal of resistor 154. Resistor 150 and capacitor 158 are of such values that pulses are generated at the rate of approximately one per second. These trigger pulses are transmitted to line 142 whenever a reed switch 148 is energized by a reed coil 144.

In order to energize coil 144 when the laundry liquid within casing 12 is at the proper level, fill sensor circuit 128 (see FIGURE 2B) is provided. Circuit 128 is energized during the FILL step from line 100 through a diode 132, the lines 130, 126 and conducting thyristor 120. When the laundry liquid in casing 12 reaches the desired level, a normally open level sensing switch 136 closes. This allows base current to pass from line 100 through switch 136 and a resistor 138 to the base electrode of a transistor 134 driving it into conduction. Reed coil 144 (see FIGURE 2A) is now energized from line 100 through a line 145, a diode 146 and conducting transistor 134. Thus, switch 148 is closed and a pulse is transmitted from pulse generator 140 to line 142 in counter 124. Thyristor 120 now interchanges conductive states with thyristor 160 as heretofore explained. This terminates power to solenoid 38 and circuit 128, thereby terminating the FILL step, and the control is advanced to the next or WASH step.

Conduction of thyristor 160 energizes relay 162 (see FIGURE 2A) from line 100 through a diode 164 and a line 166, which energizes drive motor 22. Solenoid 28 is also energized from line 100 through a diode 168 and the lines 167 and 166. Agitator 16 is now driven in an oscillatory fashion by motor 22, thereby washing clothing contained within basket 14. Energized solenoid 28 further sets valve 48 in said first position, thereby causing pump 46 to recirculate laundry liquid through the lint filter.

The WASH step continues for a period of time determined by wash timer 78 which is powered from line 100 through a diode 170, the lines 172 and 166 and conducting thyristor 160. A capacitor 174 charges from line 100 through preset timing resistor 76 to the firing potential of a unijunction transistor 176 in the previously preset time of 12 minutes. Capacitor 174 then discharges through a diode 178 into the emitter electrode of transistor 176 and on through a resistor 180. The resulting voltage drop across resistor 180 provides a gating pulse for a thyristor 184 and it begins conducting. Coil 144 is now energized from line 100 through line 145, thereby closing switch 148. This results in transmittal of a pulse to line 142 in a manner heretofore described and thyristor 160 extinguishes as a thyristor 185 fires. This terminates power to wash timer 78, motor relay 162, and solenoid 28. The WASH step of the machine's cycle of operation is now complete and the control has advanced to the next or PUMP-OUT step.

Conduction of thyristor 185 in counter 124 maintains relay 162 energized; however, the conductive path now consists of a diode 186 and a line 188. Since solenoid 28 is de-energized, valve 48 is moved to said second position and pump 46 drains laundry liquid from casing 12. Termination of the PUMP-OUT step is controlled by drain sensor 190 which is energized directly from the 115 volt AC line through a transformer 192. With thyristor 185 in conduction, the conductive path to ground for the drain sensor 190 is established via a diode 194 and the lines 196 and 188. Connected in series across the secondary of transformer 192 is a resistor 200 and a sensor 198. Sensor 198 consists of two conductive electrodes electrically isolated from each other and disposed in conduit 52 (see FIGURE 1) such that laundry liquid passing through conduit 52 shorts the two electrodes together. With laundry liquid passing through conduit 52, AC voltage appearing across the secondary of transformer 192 is dropped across resistor 200; thus, a capacitor 202 cannot charge through a diode 204. However, when casing 12 is completely drained, no laundry liquid will be present in conduit 52 to short out sensor 198 and capacitor 202 will charge. This biases on a transistor 206 through a resistor 208 and coil 144 is once again energized from lise 100 through line 145 and a diode 210. Switch 148 now closes and a gating pulse appears on line 142 causing thyristor 185 to extinguish as a thyristor 211 goes into conduction. With the nonconduction of thyristor 185, drain sensor circuit 190 and motor relay 162 are de-energized as the control advances to the next or SPIN-SPRAY step.

Conducting thyristor 211 maintains relay 162 energized from line 100 through a diode 212 and a line 214. Solenoid 32 is energized through a diode 216 and the lines 214 and 215. Thus, basket 14 is spun at high speed by motor 22 through transmission 20 to centrifugally extract laundry liquid from the clothing. Since solenoid 28 is de-energized, valve 48 remains in its second position and pump 46 expels water extracted from the clothing out drain conduit 52. During this step, short bursts of cold laundry liquid are sprayed against the clothing to effect further rinsing by intermittently energizing solenoid 44. To perform this function and also to time the total duration of the SPIN-SPRAY step, spray rinse timer 218 is provided.

Spray rinse timer 218 is energized from line 100 through a diode 220 and the lines 222 and 214. When power is initially applied to spray rinse timer 218, a thyristor 224 is fired by a pulse transmitted to its gate electrode through a parallel connected resistor 226 and a capacitor 228. With thyristor 224 in conduction, the line 230 is effectively tied to ground. Power from the line 232 now biases a transistor 234 into conduction through a resistor 236 and a parallel connected resistor 238 and a capacitor 240. Note also that biasing potential appears at the base electrode of a transistor 242 through a resistor 244 and the parallel combination of a resistor 246 and a capacitor 248. However, due to a capacitor 250 connected from the base electrode of transistor 242 to line 230, the bias voltage for transistor 242 is initially shorted to ground preventing its turn on. Since transistors 234 and 242 are connected in a flip-flop arrangement well known to those versed in the art, transistor 242 is prevented from turning on by the earlier conduction of transistor 234.

With transistor 242 out of conduction, a potential of approximately 24 volts appears at its collector. This voltage also appears on the line 256 and charges a timing capacitor 258 through a timing resistor 260 and a diode 262 to the breakdown voltage of a unijunction transistor 264 in approximately two minutes. It then discharges via a diode 266 and transistor 264 through a resistor 268. This gives rise to a gating pulse which is transmitted through a resistor 270 to the emitter electrodes of transistors 234 and 242. Transistor 242 is now driven into conduction and transistor 234 is simultaneously extinguished in the manner well known.

With transistor 234 out of conduction, the voltage at its collector electrode rises to near 24 volts. This voltage appears on a line 272 and biases a transistor 280 into conduction through a Zener diode 282 and a resistor 284. With transistor 280 in conduction, solenoid 44 (see FIGURE 2A) is energized through rotary switch 74, a line 286 and a diode 290. Cold laundry liquid is now being sprayed into the spinning basket to effect the SPRAY-RINSE step.

The voltage on line 272 resulting from nonconduction of transistor 234 is also effective in charging capacitor 258 through a timing resistor 292 and a diode 294. Resistor 292 is of such value that capacitor 258 charges to the breakover voltage of transistor 264 in approximately seven seconds. At this time, transistor 264 breaks over and a gating pulse is delivered via resistor 270 to the flip-flop circuit. Transistor 234 now goes into conduction as transistor 242 goes out of conduction. When transistor 242 goes out of conduction, solenoid 44 is de-energized and the cold laundry liquid spray is stopped. Note that during the seven seconds that transistor 234 was out of conduction, a timing capacitor 274 was also charging from line 272 through a diode 278 and a timing resistor 276. However, due to the values of resistor 276 and capacitor 274, capacitor 274 requires twenty eight seconds of charge time before it reaches the breakdown potential of a unijunction transistor 296. Thus, capacitor 274 merely retains the increments of charge which it receives each time transistor 234 is cut off.

With transistor 242 again out of conduction and transistor 234 in conduction, the same series of events as heretofore described will be repeated. Each time transistor 234 is forced out of conduction, cold laundry liquid is sprayed into the basket 14 for a seven-second period and capacitor 274 accumulates additional charge. After twenty-eight seconds of total charge time, which represents four periods of seven seconds each during which transistor 234 is nonconductive, capacitor 274 accumulates sufficient voltage to breakover transistor 296. Capacitor 274 now discharges through transistor 296 causing a voltage pulse across a resistor 298. This pulse is conducted through a capacitor 300 to a thyristor 302, thereby rendering it conductive. As thyristor 302 switches into conduction, a commutating capacitor 304 suddenly discharges causing the voltage drop across thyristor 224 to go to zero instantaneously. Thyristor 224 now extinguishes. Conducting thyristor 302 also energizes coil 144 through line 145, thereby closing switch 148. This fires a thyristor 313 in counter 124 which extinguishes thyristor 211. With the extinguishing of thyristor 211, power is broken to relay 162, spray rinse timer 218 and solenoid 32 as the machine advances to the second FILL step.

Power from line 100 is delivered to solenoid 44 through selector switch 74 and line 286. This causes cold laundry liquid used during the RINSE step to flow into casing 12. Since relay 162 isn't energized during this step, motor 22 will not operate and pump 46 will not be driven; thus, cold laundry liquid won't be drained from casing 12 even though valve 48 is in a position to cause pump-out. Power is also supplied to fill sensor circuit 128 from line 100 through a diode 314 and the lines 316 and 286. The operation of fill sensor circuit 128 is identical to that heretofore described. When a desired level of laundry liquid is sensed in casing 12, a pulse is transmitted on line 142 to counter 124 and thyristor 313 interchanges conductive states with a thyristor 317 and the control is advanced to the next, or RINSE step.

Relay 162 is again energized from line 100 through a diode 318 and a line 320. Solenoid 28 is also energized from line 100 through a diode 322 and the lines 320 and 321. Thus, agitator 16 is driven in an oscillatory fashion to perform the RINSE step on the clothing contained within basket 16. Further, valve 48 is moved to its first position since solenoid 28 is energized and pump 46 recirculates laundry liquid through the lint filter.

Termination of the RINSE step is controlled by rinse timer 324 which is energized from line 100 through a diode 326 and the lines 328 and 320. A timing capacitor 332 charges from line 100 through a timing resistor 330. After a predetermined time, capacitor 332 discharges through a diode 336 and a unijunction transistor 334. This generates a voltage pulse across a resistor 338 which is transmitted to a thyristor 340, thereby rendering it conductive. Coil 144 is now energized through thyristor 340 and switch 148 closes. A pulses appears on line 142 and a thyristor 341 fires as thyristor 317 is cut off to advance the control to the next, or second PUMP-OUT step.

With thyristor 341 in conduction, relay 162 is maintained energized from line 100 through a diode 342 and a line 344. Since solenoid 28 is de-energized, valve 48 is moved to its second position and pump 46, driven by motor 22, now drains laundry liquid from casing 12 out conduit 52. As before, drain sensor 190 is energized from line 100 through a diode 346 and the lines 348, 344. As heretofore described, when sensor 198 detects an absence of water in conduit 50, it causes a pulse to be transmitted to line 142. This is effective in firing a thyristor 349 and cutting off thyristor 341, thereby advancing the control to the next, or second SPIN-SPRAY step.

During this step, relay 162 is maintained energized from line 100 through a diode 350 and a line 352. Solenoid 32 is also energized from line 100 through a diode 354 and the lines 352 and 353. This causes basket 14 to spin at high speed, thereby extracting laundry liquid from clothing contained therein. Since solenoid 28 remains de-energized, valve 48 directs laundry liquid extracted from the clothing through pump 46 and on out drain conduit 52. In order to introduce intermittent sprays of cold laundry liquid into spinning basket 14 and also terminate the SPIN-SPRAY step, spray rinse timer 218 is again utilized. It is powered from line 100 through a diode 358 and a line 356 and operates precisely the same as heretofore described. After a length of time determined by spray-rinse timer 218, a pulse is transmitted to line 142, thereby firing a thyristor 359 and cutting off thyristor 349, and the control is advanced to the next or SPIN DRY step.

Relay 162 is maintained energized from line 100 through a diode 360 and a line 362 and solenoid 32 remains energized from line 100 through a diode 364 and the lines 362 and 365. Thus, basket 14 continues to rotate at high speed, but with no short sprays of laundry liquid, thereby extracting water from the clothing contained therein. As before, pump 46 is maintained actuated to continually pump laundry liquid from casing 12.

To sense when the clothing is sufficiently dry to terminate the SPIN DRY step, a spin-dry sensor circuit 366 is provided. Spin-dry sensor circuit 366 is powered from line 100 through a diode 368 and a line 370. A pair of electrically insulated electrodes 372 (see FIGURE 1) is mounted on the wall of casing 12 such that water thrown from perforated basket 14 against the interior wall of casing 12 shorts electrodes 372 together. With electrodes 372 shorted, no charge can build up on a capacitor 374 (see FIGURE 2A) and a pair of resistors 376 and 378 bias a field effect transistor 380 on. With transistor 380 biased on, base drive for a transistor 384 is provided through a resistor 382. This maintains transistor 384 in a conductive state and gate signal is shunted away from a thyristor 386. However, with electrodes 372 no longer shorted, indicating that a small amount of water is being extracted from the clothing within basket 14, charge builds up on capacitor 374. This ultimately biases transistor 380 into an off condition. Base drive for transistor 384 is now terminated and it goes out of conduction. Thyristor 386 is now fired by current passing through a resistor 388. With thyristor 386 in conduction, coil 144 is again energized and switch 148 closes. This initiates a pulse on line 142 and thyristor 359 is extinguished. A thyristor 361 now goes into conduction and energizes an indicator lamp 363 indicating the termination of a normal cycle of operation and the clothing may be removed from the washer.

Referring now to FIGURE 1, note that a pushbutton is pictured on console 56 corresponding to each step in the machine's cycle of operation. Although the switches corresponding to each pushbutton are not individually depicted in the schematic diagram, it is apparent that if each of pushbuttons 62 through 70 control switch 108 (see FIGURE 2B) and a switch 112a (as shown in dotted lines on FIGURE 2A) having one lead connected to the ground side of resistor 115 and the other lead connected to the gate of an appropriate thyristor in counter Stages II through X, it would be possible to initiate the counter at any desired stage. This allows the operator to initiate machine operation at any step, or if desired to manually override the electronic control by skipping various steps. Thus, considerable flexibility is built into the control.

In line with the above mentioned versatility, it is also important that the machine reject a manual command which results in possible machine or clothing damage. An example of such a condition is a command for a WASH or RINSE step at a time when casing 12 contains no laundry liquid. If the machine accepted this command, agitator 16 would oscillate and might tear clothing contained within basket 14. Alternately, if the operator selects a SPIN operation with casing 12 full of laundry liquid, considerable machine damage might result from overloading the machine's drive train.

In order to prevent these undesirable conditions, fill-wash interlock circuit 390 and drain-spin interlock circuit 392 are provided. Looking first at interlock circuit 390, note that the anode of a diode 394 is connected to the gate electrode of thyristor 160 and the anode of a diode 396 is connected to the gate electrode of thyristor 317. With this circuit arrangement, if the transistor 398 is in a conducting state, any signals transmitted to the gate electrodes of thyristors 160 or 317 are shorted to ground, thus making them ineffective in triggering their respective thyristors. In order for agitator 16 to be driven in an oscillatory fashion, transistor 398 has to be in a non-conductive state. Transistor 398 is in such a state only when a transistor 400 is in a conducting state. Since the base drive for transistor 400 is supplied from line 100 through switch 136, a resistor 402 and a line 401, transistor 400 is conductive only when switch 136 is closed, indicating the presence of a full tub of laundry liquid. Therefore, agitation can be initiated only when casing 12 is full of water.

Turning now to drain-spin interlock circuit 392, note that the anodes of the diodes 404, 406 and 408 are connected to the gate electrodes of thyristors 211, 349 and 359, respectively. With a transistor 410 conducting, any gating signal arriving at thyristors 211, 349 or 359 is shunted away. However, transistor 410 is conductive only when a transistor 412 is nonconductive. Base drive for transistor 412 is provided from capacitor 202 in drain sensor circuit 190 through a resistor 414 and a line 403. If laundry liquid is present in conduit 52, sensor 198 is shorted and no charge is present on capacitor 202. This cuts off transistor 412 thereby allowing transistor 410 to saturate. Thus, if laundry liquid is present in the drain of the washing machine, gating signals impressed on thyristors 211, 349 or 359 are ineffective in turning them on. This arrangement insures that basket 14 cannot be spun as long as casing 12 contains laundry liquid.

While one embodiment of the invention has been shown and described, it is to be understood that it is capable of many modifications. Changes in the construction and arrangement may be made without departing from the spirit and scope of the invention as defined in the appended claims. The embodiments of the invention in which an exclusive property or privilege is claimed are defined as follows.

We claim:
1. In a laundry appliance having a plurality of electromechanical components, control circuit means for connecting said components to a source of power comprising:
(a) electronic counter means having a sequence of discrete stages, each of the stages connected with a predetermined group of the components,
(b) sensor means located within the appliance for producing a signal in response to sensing a predetermined condition of the appliance, and,
(c) condition responsive means connected with the counter means and with the sensor means for sequentially advancing the counter means in response to the signal.

2. A control circuit as defined in claim 1 and further including pulse generating means connected with the condition responsive means and the counter means for stepping the counter from one of the discrete stages to a subsequent one of the discrete stages in response to the signal.

3. A control circuit means as defined in claim 1 and further including manually operated cycle selection means connected with the counter means whereby operation of the appliance may be initiated at a selected one of the stages.

4. Control circuit means as defined in claim 2 wherein said pulse generating means includes a unijunction transistor relaxation oscillator, a relay operated switch, and a relay coil, the switch being connected intermediate the oscillator and the counter means to selectively conduct pulses generated by the oscillator to the counter means in response to energization of the coil by the signal.

5. An electronic control system for a sequentially operated washing apparatus including a tub for holding liquid, a basket within the tub for holding fabrics to be laundered in the presence of liquid, means for admitting liquid to the tub, means for agitating fabrics within the basket in the precence of liquid, means for expelling liquid from the tub, and means for rotating the basket at a high speed to centrifugally extract liquid from fabrics in the basket, comprising:
(a) a plurality of electronic timing circuits for generating pulses after predetermined time delays,
(b) a plurality of condition responsive circuits for generating signals in response to sensed conditions within the apparatus, and,
(c) a ring counter having predetermined stages thereof stepped by the plurality of timing circuits and other stages thereof stepped by the plurality of condition responsive circuits for controlling the liquid admission means, the agitation means, the liquid expelling means, and the basket rotating means.

6. In a laundry appliance for washing fabrics including a casing for containing laundry liquid and a conduit for routing laundry liquid to said casing, a control circuit comprising:
(a) an electronic counter having a sequence of discrete stages,
(b) an electrically actuated valve connected with selected stages of the counter and energized therefrom for controlling passage of laundry liquid through the conduit,
(c) condition responsive means connected with the selected stages and energized therefrom, and,
(d) sensing means connected with the condition responsive means for producing a signal in response to a predetermined level of laundry liquid in the casing whereby the condition responsive means advances the counter thereby deenergizing the valve.

7. A control circuit as defined in claim 6 wherein the sensing means comprises a pneumatically actuated switch movable between first and second positions and the condition responsive means includes semiconductor means capable of assuming first and second conductive states and having a control electrode, the switch being connected with the control electrode whereby movement of the switch from the first to the second position causes the semiconductor means to transfer from the first to the second conductive state.

8. In a laundry appliance for washing fabrics including a casing for containing liquid and a conduit for routing liquid from the casing to a suitable drain, a control circuit comprising:
(a) an electronic counter having a sequence of discrete stages, (b) electrically actuated means connected to selected stages of the counter and energized therefrom for controlling passage of liquid through the conduit, (c) condition responsive means connected to the selected stages for energization therefrom, and, (d) sensor means connected to the condition responsive means for producing a signal in response to the cessation of flow of laundry liquid through the conduit whereby the condition responsive means advances the counter to terminate power to the electrically activated means.

9. A control circuit according to claim 8 wherein the sensor means comprises first and second electrically isolated electrodes positioned in the appliance such that laundry liquid passing through the conduit may bridge the electrodes.

10. A control circuit according to claim 9 wherein the condition responsive means includes a capacitor and semiconductor means capable of assuming first and second conductive states and having a control electrode, the first electrode of the sensor means connected to a first lead of the capacitor and the control electrode and the second electrode of the sensor means connected to the other lead of the capacitor, whereby the semiconductor means transfer from the first to the second conductive state in response to cessation of liquid flow through the conduit.

11. In a laundry appliance for washing fabrics including a casing, a basket journalled for rotation within the casing and drive means for rotating the basket at a predetermined speed to centrifugally extract liquid from fabrics contained within the basket, a control circuit comprising:

(a) an electronic counter having a sequence of discrete stages, (b) electrically actuated means connected to selected stages of the counter and energized therefrom for controlling the drive means, (c) condition responsive means connected to the selected stages for energization therefrom and, (d) sensor means associated with the appliance and connected to the condition responsive means for producing a signal when the quantity of liquid being centrifugally extracted from fabrics in the basket drops below a predetermined level whereby the condition responsive means advances the counter to deenergize the electrically actuated means.

12. A control circuit as defined in claim 11 wherein the sensor comprises a pair of electrically isolated electrodes positioned within the appliance to be bridged by liquid extracted from the fabrics during rotation of the basket.

13. A control circuit as defined in claim 12 wherein the condition responsive means includes:

(a) a field effect transistor capable of assuming first and second conductive states and having a control electrode, the control electrode connected with the sensor means whereby the signal causes the transistor to pass from the first to the second conductive state, and (b) amplifier circuit means associated with the transistor whereby the counter is advanced in response to the transistor entering the second conductive state.

14. In a laundry appliance for washing fabrics including a casing, a basket journalled for rotation within the casing, drive means for rotating the basket, an electrically actuated clutch controlling application of torque by the drive means to the basket, conduit means for routing liquid to the basket, and an electrically actuated valve controlling flow of liquid through the conduit, a control circuit comprising:

(a) first and second transistors interconnected to form a bistable multivibrator, (b) a first relaxation oscillator having a first timing capacitor for generating pulses to trigger the multivibrator, (c) a first timing resistor connected between the collector of the first transistor and the timing capacitor whereby the first transistor is nonconductive for a period of time determined by the time constant of the first resistor in series with the first timing capacitor, (d) a second timing resistor connected between the collector of the second transistor and the first timing capacitor whereby the second transistor is nonconductive for a period of time determined by the time constant of the second resistor in series with the first timing capacitor, (e) amplifier circuit means connected with the first transistor and the valve whereby liquid is admitted to the basket through the conduit while the first transistor is nonconductive, (f) a second relaxation oscillator having a second timing capacitor, (g) a third resistor connected from the collector of the first transistor to the second timing capacitor whereby the second timing capacitor accumulates sufficient voltage to fire the second oscillator after the first transistor has been rendered nonconductive a predetermined number of times, and, (h) second amplifier circuit means connected with the second oscillator and the clutch terminates application of torque to the basket in response to firing of the second oscillator.

References Cited

UNITED STATES PATENTS

| 3,325,657 | 6/1967 | Corey | 307—141 X |
| 3,388,566 | 6/1968 | Kaper et al. | 68—12 |
| 3,391,788 | 7/1968 | Strandberg et al. | 68—12 X |
| 3,398,295 | 8/1968 | Fathauer | 307—141.4 |

WILLIAM I. PRICE, Primary Examiner

U.S. Cl. X.R.

68—23.5; 307—141, 141.4

UNITED STATES PATENT OFFICE
CERTIFICATE OF CORRECTION

Patent No. 3,477,258           Dated November 11, 1969

Inventor(s) Douglas J. Walker and Oscar A.W. Tichy

It is certified that error appears in the above-identified patent and that said Letters Patent are hereby corrected as shown below:

In the claims, column 12, line 42, after the word clutch insert --whereby the clutch--.

SIGNED AND SEALED
JUN 9 1970

(SEAL)
Attest:

Edward M. Fletcher, Jr.
Attesting Officer

WILLIAM E. SCHUYLER, JR.
Commissioner of Patents